May 30, 1961  W. H. PITTS, JR  2,986,251
MAGNETIC CLUTCH
Filed Oct. 6, 1958  3 Sheets-Sheet 1

INVENTOR.
WADE H. PITTS, JR.
BY
Blair, Spencer & Buckles
ATTORNEYS

May 30, 1961 W. H. PITTS, JR 2,986,251
MAGNETIC CLUTCH

Filed Oct. 6, 1958 3 Sheets-Sheet 2

INVENTOR.
WADE H. PITTS, JR.
BY
*Blair, Spencer & Buckles*
ATTORNEYS

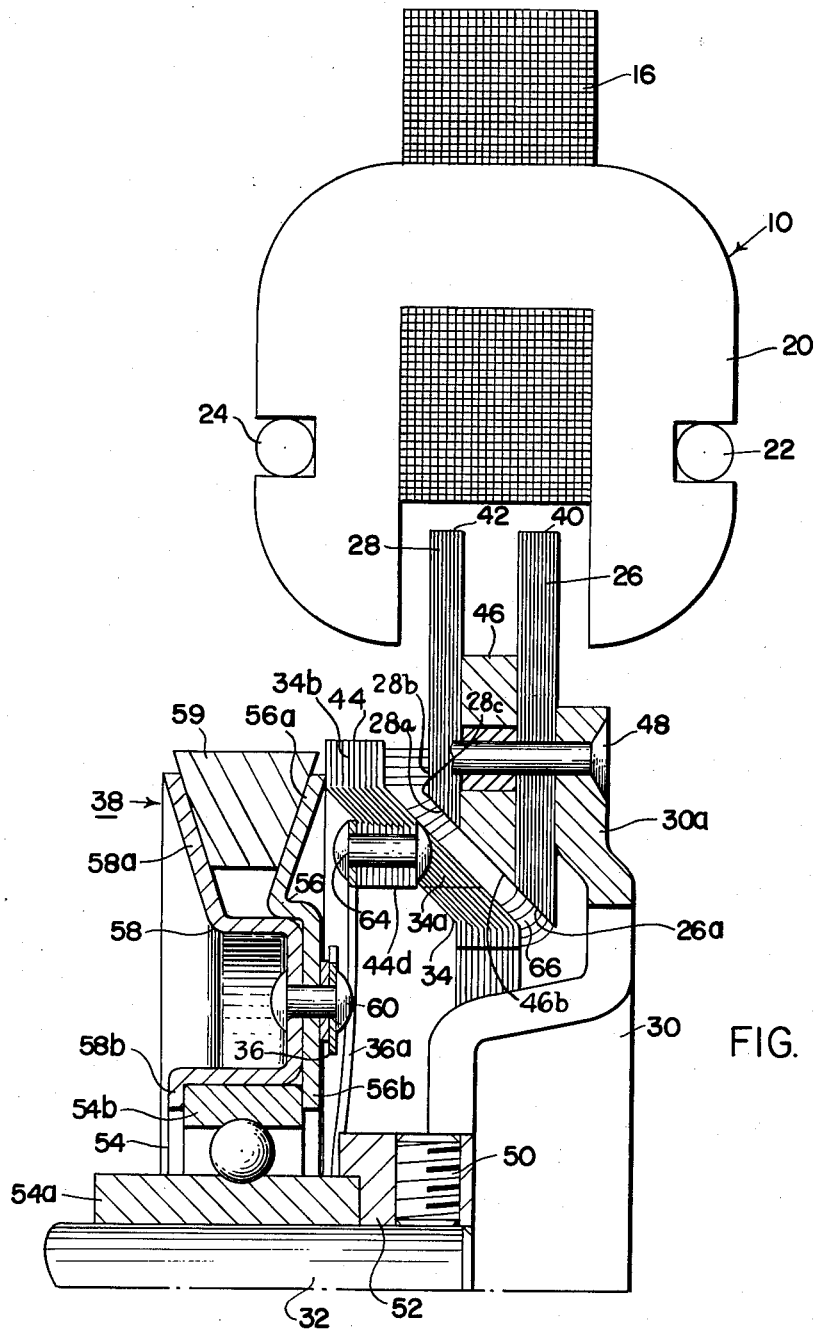

United States Patent Office 2,986,251
Patented May 30, 1961

2,986,251
MAGNETIC CLUTCH
Wade H. Pitts, Jr., U.S. Clutch Co., 171 Neil St., Memphis, Tenn.
Filed Oct. 6, 1958, Ser. No. 765,462
16 Claims. (Cl. 192—84)

This invention relates to an improved magnetic clutch adapted for both alternating- and direct-current operation. More particularly, it relates to a high-torque clutch of minimum size which has high efficiency in A.-C. operation. The novel construction to be described permits the use of relatively low cost metal stampings in place of the machined castings required in the magnetic clutches heretofore available.

Magnetically operated clutches have found increasingly wide application as control means for applying rotational power to machinery in confined locations, either remote from or relatively inaccessible to convenient control stations. In such cases a mechanical operating linkage often proves to be excessively cumbersome and costly, as well as needful of frequent adjustments and repairs. Magnetically operated clutches, on the other hand, require only a pair of electrical conductors to transmit an electrical operating current from the controlling point to the clutch, and are thus free from these problems. Furthermore, these clutches are particularly well adapted for use in automatically controlled equipments where electrical signals are normally the medium of control. One example of such utility is in automotive air-conditioning systems, where it is necessary to apply rotational energy from a car engine to a refrigeration compressor in response to demand from a manual switch or thermostat within the car enclosure.

These clutches are also of great utility in applications where space is at a premium, since in their more desirable form they comprise small self-contained units including both the clutch members and the clutch operating mechanisms. No space is required for the external linkages, forks, etc., associated with mechanically operated units. Prior to my invention, the only clutches meeting all these requirements were actuated by direct current. These D.-C. clutches provide a high degree of compactness, coupled with low cost, by utilizing the clutching members as the pole pieces of the magnetic actuating system.

However, heretofore, no one has successfully adapted this double duty arrangement of the clutching member-pole pieces for alternating current operation. Hence, when it has been desired to employ magnetic clutches to control machinery in locations where A.-C. power is the only source available, it has been necessary to employ costly rectifier systems to provide the requisite D.-C. power for operation of the clutch energizing coil. In an A.-C. magnet the flux decreases to zero twice during each electric current cycle and is at a low level during an appreciable portion of the cycle, although the average flux is, of course, at a higher level. The force exerted by the magnet members, being proportional to flux, varies in the same manner. This problem has been overcome in conventional electro-magnets, relays, etc., where the inertia of the movable member, contact resilience, and other design characteristics are relied upon to maintain the movable member in its operative position. Prior to my invention, no such arrangement had been successfully devised for the clutch member-pole pieces of a magnetic clutch. Even though the inertia of the movable clutch member may keep it in contact with the mating clutch surface, the magnetic attracting force periodically reaches negligible proportions and the frictional clutching force therefore does likewise. A further impediment in the design of an A.-C. magnetic clutch is the requirement of a laminated construction to minimize eddy current losses. There was heretofore no low cost laminated construction permitting rotatable clutching members to provide double duty service as described above.

Consequently, A.-C. operation of clutches has in the past been limited to the use of external solenoids. Such arrangements are often bulkier than straight mechanical devices, since the solenoids merely form additional appendages to the conventional external mechanical linkage. Moreover, these clutches require frequent adjustment and are inefficient in the use of electrical power. Internal solenoids have also been proposed, but have failed of commercial adoption largely because of their considerable size and the relatively high cost of manufacture. Moreover, the effective clutching force provided by them has generally left something to be desired.

Accordingly, it is a principal object of my invention to provide an improved magnetically operated clutch adapted for operation with either alternating or direct current. It is another object of my invention to provide a clutch of the above character utilizing the clutch members as force-producing elements in the magnetic circuit, thereby eliminating the added bulk, inefficiency and cost inherent in the use of separate clutch members and closure elements. A further object of my invention is to provide a clutch of the above character capable of high-torque and requiring minimum electric power for operation. A still further object of my invention is to provide a clutch of the above character having minimum diameter and axial length, and therefore adapted as a direct replacement for present mechanically operated clutches without changing other elements in the mechanical drive controlled by the clutch. Yet another object of my invention is to provide a simple low cost magnetic clutch construction readily adapted to mass production and requiring a minimum of machining operations. Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

Figure 7 is a fragmentary enlarged view, similar to Figure 3, showing the path of magnetic flux through the magnetic circuit of the clutch.

In general, my clutch has an axially fixed rotatable clutch member comprising two laminated pole pieces coupled to a source of magnetic flux. An axially movable independently rotatable member comprising a laminated armature is pulled toward the pole pieces to engage both of them and close the magnetic gap therebetween. Such engagement brings about a frictionally fixed relationship between the two rotatable members so that they rotate together. A novel construction to be described permits double duty operation of the clutch members with alternating flux, such operation not being possible in prior clutches, as pointed out above. Further, even in D.-C. operation, the operating torque is unusually high for a clutch of such small size.

More particularly, the engaging surfaces of the clutch members are conical in shape and radially displaced from the axis of rotation. This combination of shape and location provides a greater engaging surface in a smaller range of diameter and axial length. High-torque is a resulting characteristic of this arrangement.

Of further importance is the fact that the mating conical surfaces effect a wedging action on each other when the clutch is engaged, thereby additionally increasing the frictional forces between them and increasing the operating torque. Moreover, the rotatable members resiliently yield under such wedging action and, in a manner to be described, they consequently maintain substantial friction forces and high-torque even during the portions of the alternating current cycle when the magnetic forces are at a low level.

Figure 1:
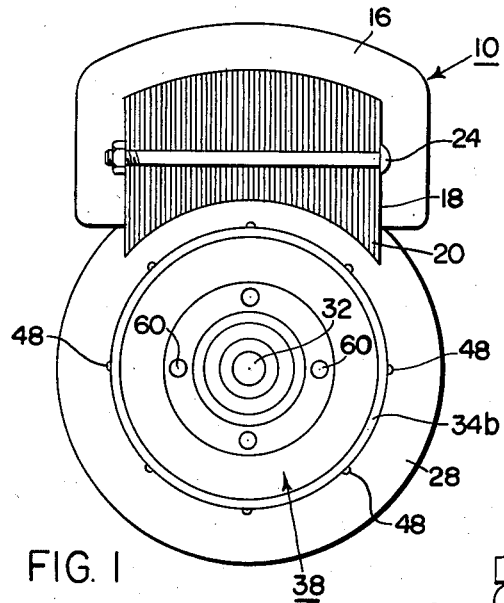
Figure 1 is a view of one end of a clutch made according to my invention, taken along the axis of clutch rotation.
Figure 2:
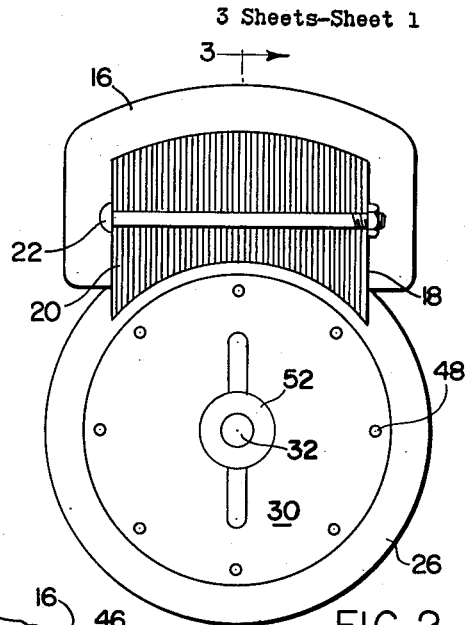
Figure 2 is a view, similar to Figure 1, of the other end of the clutch.

Turning now to Figures 1, 2, 3, 4 and 7, the clutch is seen to comprise a coil assembly generally indicated at 10, a driven clutch member generally indicated at 12, and an axially movable driving member generally indicated at 14. As best seen in Figures 2 and 7, assembly 10 comprises an electrical winding 16 formed on a horse-shoe pole piece 18. Pole piece 18 is fabricated from a plurality of laminations 20, accurately stacked to interfit with or surround driven member 12, and secured together by a pair of bolts 22 and 24. Assembly 10 may be secured in position by suitable supporting means (not shown).

The driven member 12 includes a pair of annular laminated pole pieces 26 and 28 closely fitting within, but spaced from, pole piece 18 for rotation therein in a manner to be described. Pieces 26 and 28, which are mounted on a hub 30 to drive a shaft 32, also provide the clutching surfaces of the driven member 12. Driving member 14 comprises a conical laminated armature 34 interfitting within pole pieces 26 and 28, and a leaf spring 36 connecting armature 34 to a drive pulley generally indicated at 38 for rotation therewith. As will be demonstrated, the clutch is adapted to transmit torque from pulley 38 to shaft 32 by axial movement of the driving armature 34 into engagement with annular pole pieces 26 and 28.

More particularly, pole piece 26 comprises a stack of annular laminations 40 (Figures 4 and 7) and pole piece 28 includes a stack of similar laminations 42. These laminations, like laminations 20 of polepiece 18 and laminations 44 of armature 34, are of a low reluctance material such as a silicon transformer steel, and are separated by an annular spaced 46 of non-magnetic material such as brass. Preferably, a plurality of brass rivets 48 (Figure 4) holds the pole pieces together and secures them to the outer flange 30a of hub 30. Hub 30 is preferably also of brass and may readily be formed in conventional drawing or stamping machinery.

Still referring to Figure 7, the inner surfaces 26a, 28a and 46a of pole pieces 26 and 28 and spacer 46 are tapered to conform generally to the conically tapered portion 34a of armature 34. This shape may be formed by constructing the pole pieces and the spacer of uniformly cut material from conventional stamping presses and then chucking the entire driven member 12 on shaft 32 and finishing the surfaces to the desired taper in a simple machine operation.

Figures 3, 4:
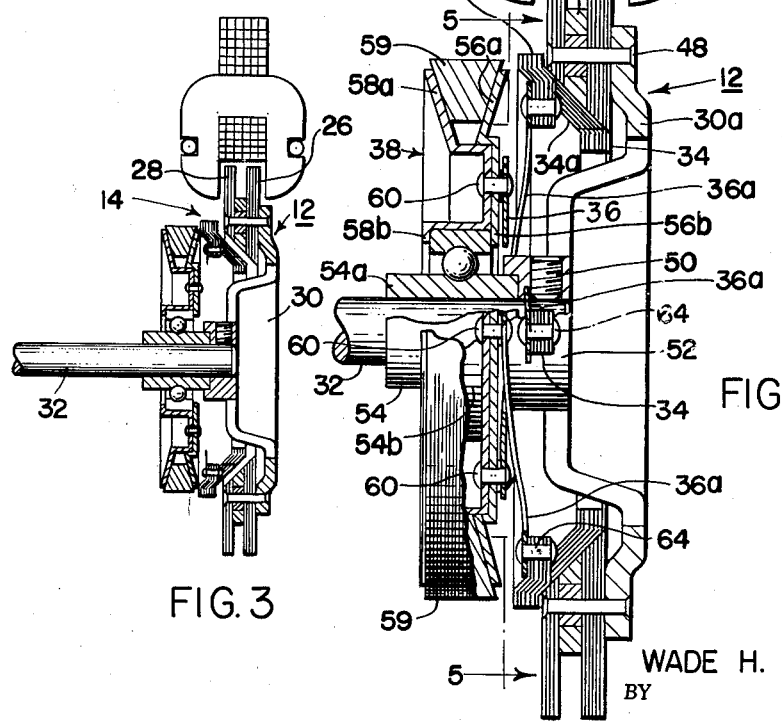
Figure 3 is a sectional view taken along line 3—3 of Figure 2 with the clutch disengaged and showing the construction and mode of operation of the various clutch members.
Figure 4 is an enlarged view similar to Figure 3, taken with the clutch in the engaged position.

Shaft 32 is secured by a set screw 50 in a bushing 52 press-fitted or brazed to the hub 30, and the inner race 54a of a bearing 54 may be press-fitted into bushing 52 as best seen in Figures 4 and 7. The shaft may be constrained against axial movement by any suitable means (not shown) to properly center pole pieces 26 and 28 within the pole piece 18.

Figure 5:
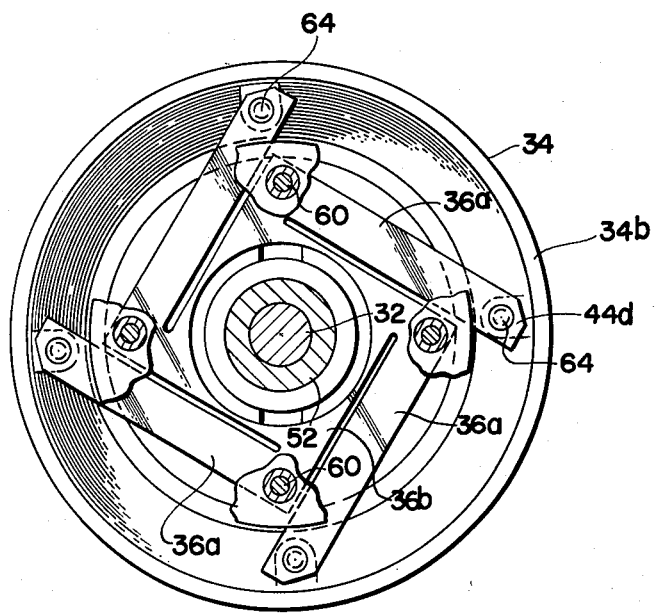
Figure 5 is a view taken along line 5—5 of Figure 4 and partly broken away to show in detail the mounting of the movable clutch member.

As best seen in Figures 4 and 7, pulley 38 comprises a pair of interfitting stamped metal parts 56 and 58 having outer annular V portions 56a and 58a cooperating to form a groove for a conventional V belt 59. Parts 56 and 58 are held together by rivets 60 which serve also to clamp outer race 54b of bearing 54 between inner annular portions 56b and 58b. In this manner the pulley is enabled to rotate about the shaft 32 in fixed axial relationship to the driven clutch member 12. Rivets 60 also serve to fasten leaf spring 36 to the pulley 38. More particularly, as best seen in Figure 5, spring 36 has a series of leaf portions 36a extending from and generally tangential to a central portion 36b having a radial clearance from bushing 52. Rivets 60 secure pulley 38 to the inner ends of the leaves 36a, while the outer ends of the leaves are secured to the armature 34 in a manner to be described. Thus, it will be apparent that rotation of pulley 38 will cause similar rotational movement of spring 36 and member 34. However, leaves 36a are resiliently yieldable in a direction perpendicular to their flat surfaces (Figure 5) and, therefore, armature 34 may move axially with respect to pulley 38 when magnetically attracted to pole pieces 26 and 28 (Figure 4). Upon cessation of such magnetic forces, the spring 36 returns the armature to its disengaged position (Figures 3 and 7).

Figure 6:
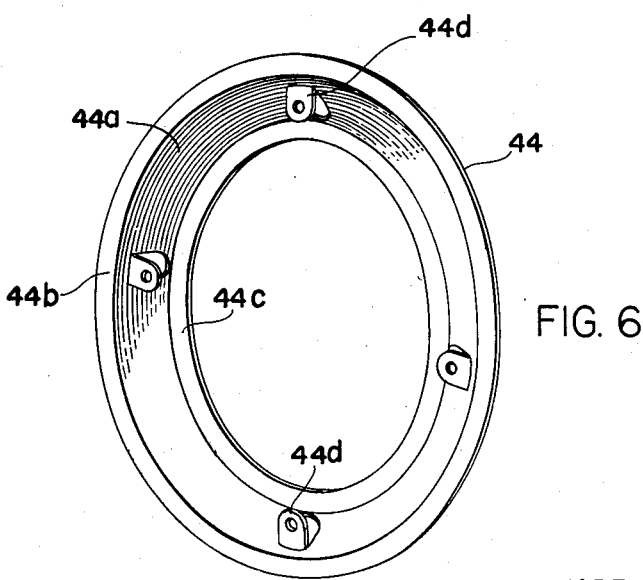
Figure 6 is a perspective view of an armature lamination in the clutch.

Referring to Figure 6, armature 34 comprises a plurality of stacked, dish-shaped laminations 44, each having conical central portions 44a and outer and inner radially extending annular portions 44b and 44c. As pointed out above, conical portions 44a have approximately the same taper as the inner conical surfaces of driven member 12. The laminations 44 may be stamped from a single die, as they all have the same dimensions and fit together in a nesting relationship to form the armature 34. The stamping operation, in addition to forming the aforementioned portions, bends ear portions 44d inwardly from conical portion 44a and punches them to receive rivets 64 which hold the laminations 44 together and secure the stacked laminations of armature 34 to the outer ends of the spring leaves 36a.

In operation, with belt 59 driving pulley 38 and armature 34 (Figures 3, 4 and 7), the clutch may be engaged by energizing coil 16 to develop a magnetic field substantially as indicated in Figure 7. This field, extending across gap 66, draws the driving armature member 34 to the right (Figure 7) to bring the conical surfaces of the armature and the driven member 12 into engagement. The magnetic attraction holds these parts together with sufficient force to cause member 12 to commence rotation with member 34 and thereby drive the load (not shown) connected to shaft 32.

It will be noted that the magnetic forces in gap 66 between pole pieces 26 and 28 and the tapered central portion 34a of the armature are predominantly axial in direction, and those between radially disposed surface 28b of pole piece 28 and outer rim portion 34b are entirely in this direction. Thus, as armature 34 is pulled into the driven member 12 there is a wedging action giving rise to a substantial mechanical advantage in the production of frictional forces between the two members. Consequently, these frictional forces are much greater for a given magnetizing force from coil 16 than they would be in the conventional flat plate construction of the prior art, and higher output torque is accordingly produced. Further improvement in torque capability is occasioned by the location of the clutch surfaces at a substantial distance from the axis of rotation. This is of particular importance in alternating current applications where the input volt-ampere requirement is considerably lessened with resulting savings in the control circuitry associated with the clutch.

It will be noted that for the wedging action of the armature 34 and driven member 12 to take place, the rim portion 34b need not engage surface 28b of pole piece 28 until after the conical central portion 34a of the armature 34 has contacted the conical surface of member 12, viz. surface 26a, 28a, or 46a. Accordingly, the conical portion 34a may be somewhat larger than the mating surface on the stationary member 12, or, in other words, the outer radius of portion 34a should preferably be somewhat greater than the outer radius of the corner 28c (Figure 7) of pole piece 28. Thus, as armature 34 moves to the right (Figure 7), the mating conical surfaces of the clutch will engage while a portion of the gap 66 still remains between rim 34b and surface 28b. The magnetic field between the rim and surface 28b continues to exert an axial force on armature 34 to wedge it more firmly into driven member 12.

It will be apparent that this same wedging action may be obtained by additionally or alternatively changing other relative dimensions of the conical surfaces. For example, the armature 34 might have a more gradual taper than the mating surface of driven member 12 and be so dimensioned as to engage pole piece 26 prior to meeting pole piece 28. The force exerted between rim 34b and surface 28b would be augmented by forces between surface 28a and portion 34a.

The wedging of conical armature 34 into driven conical member 12 provides a further advantage enhancing A.-C. operation of the clutch. For such wedging to be most effective, there may be some slight deformation of the mating parts. In particular, surface 34a may squeeze down to fit within the mating portions of driven member 12, and the outer radius of this surface 34a will be reduced accordingly. Further, the resilient laminations 40 of pole piece 26 may be forced somewhat to the right (Figure 7) by the slight physical deformation attendant to the magnetic wedging action. This resilient distortion of the mating parts provides, in effect, a reservoir of force. When coil 16 is energized from an alternating current source, the wedging action takes place during the periods of peak magnetic flux density. When the flux decreases to zero, during the alternating current cycle, the mating parts commence to relax toward their original configuration. During such relaxation, however, the forces resulting from deformation still exist and maintain armature 34 and driven member 12 in a tight high-friction relationship. Before the parts can fully return to normal configuration, corresponding to a lower friction force, the alternating flux once more increases to maintain the closure forces and further resiliently distort these parts. In this manner the torque capability of the clutch is not only maintained at a high average level, but ever more important, in A.-C. operation, the torque never decreases substantially below this desired level.

As pointed out above, the engaging surfaces of driven member 12 and armature 34 need not exactly fit each other perfectly, so that the portion of gap 66 between rim 34b and surface 28b may remain open after initial engagement of the conical surfaces. It should be realized, however, that this remaining gap should be quite small in order to maximize the magnetic forces acting across it, and therefore the amount of discrepancy in the dimensions or configurations of the mating parts should preferably be kept to a minimum.

Thus I have described a novel magnetically operated clutch utilizing an internal conical armature and capable of both A.-C. and D.-C. operation. The armature and the driven pole pieces to which it is attracted are utilized also as the clutching members, thereby minimizing the number of parts and consequently reducing the cost and adjustment problems of the unit. By incorporating a novel conical shape in the magnetic engaging surfaces, I provide a greatly increased torque output for a given volt-ampere alternating current input to the energizing coil. Moreover, the construction described above provides high output torque during all parts of the alternating current cycle.

It will further be apparent that through the provision of simple metal stampings, many of which may be made from a single die, I have provided a low cost construction which is simple to assemble and yet free of adjustment and maintenance problems.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sence. In particular, it is to be understood that the functions and operations of those structural parts referred to herein and in the claims as "driving" and "driven" members may be reversed or interchanged without departing from the invention.

It is also to be understood that the following claims are intended to cover all of the generic and specific features of the invention which, as a matter of language, might be said to fall therebetween.

Having described my invention, what I claim as new and desire to secure by Letters Patent is:

I claim:

1. A magnetic clutch comprising in combination, a first member adapted to rotate about a fixed axis, said first member including a pair of rotatable axially spaced annular magnetic pole pieces, a second member of substantially conically shaped magnetic material rotatable about said axis and frictionally engageable with both pole pieces of said first member, means mounting said second member for rotation about said axis independently of said first member, means normally holding said members in spaced-apart relationship, and means for inducing a magnetic field in said pole pieces and through a magnetic portion of said second member whereby said second member may be drawn into frictional engagement with said first member.

2. The combination defined in claim 1 in which said pole pieces of said first member and said magnetic portion of said second member are formed of a plurality of laminations of magnetic material said second member engaging each lamination of said pole pieces, thereby to minimize losses when an alternating magnetic field is induced in said pole pieces and increase frictional engagement between said members.

3. The combination defined in claim 1 including a fixed magnetizing assembly in closely spaced relationship to said rotatable pole pieces and adapted to pass magnetic flux in a series magnetic circuit through one of said pole pieces, said magnetic portion of said movable member, and the other of said pole pieces during rotation of said first member.

4. The combination of claim 3 wherein said magnetizing assembly comprises an electrical inductance coil disposed upon a fixed core of magnetic material, said core forming a pair of stationary pole pieces each respectively positioned in magnetic proximity to said rotatable pole pieces.

5. A magnetic clutch comprising, in combination, a pair of axially spaced magnetic pole pieces jointly rotatable about a common axis, a rotatable magnetic armature rotatable about said axis and movable therealong into frictional engagement with said pole pieces in response to the generation of a magnetic field between said pole pieces to provide transmission of torque between said rotatable armature and said rotatable pole pieces, the engaging surfaces of said armature and said pole pieces being substantially conical and providing a wedging frictional engagement between said armature and said pole pieces to minimize slippage therebetween, and electro-magnetic means for generating a magnetic field between said rotatable pole pieces.

6. The combination defined in claim 5 including rotatable axially stationary driving means and flexible spring coupling means connecting said magnetic armature to said driving means for rotation therewith, said coupling means being resiliently yieldable axially.

7. The combination defined in claim 5 wherein said rotatable armature and said pair of axially spaced pole pieces are each formed of a plurality of laminations of magnetic material, and said electro-magnetic generating means comprises a stationary field coil disposed upon a fixed magnetic member of laminated material positioned in close proximity to both of said rotatable pole pieces.

8. The combination defined in claim 5 in which one of said engaging members includes a substantially radially disposed magnetic portion axially positioned from a similar portion on the other of said surfaces, the conical portions of said surfaces being so shaped and dimensioned as to contact each other prior to contact between said radial portions during engagement of said clutch, whereby, after such initial contact the magnetic forces between said radially disposed portions further force said conical surfaces together, thereby substantially to increase the frictional forces therebetween.

9. The combination defined in claim 8 in which at least one of said engaging surfaces is adapted to yield resiliently in response to the magnetic forces bringing said surfaces into engagement.

10. A magnetic clutch comprising, in combination, a first member adapted to be driven in rotation about a fixed axis; said driven member including a pair of rotatable annular magnetic pole pieces, non-magnetic means for maintaining said pole pieces in fixed spaced relationship, and a hub mounting said pole pieces for rotation about said axis; electro-magnetic means adapted upon energization to induce magnetic flux in said rotatable pole pieces, a movable driving member including a magnetic armature and means for rotating said armature about said axis independently of said first member, said armature being adapted to move axially toward said pole pieces in response to magnetic flux induced therein, said armature having a generally conical surface adapted to interfit with a similar surface on said first member, whereby frictional engagement of said conical surfaces in response to axial movement of said armature transmits torque between said driving and driven members, said surface of said armature including a substantially radially disposed portion axially spaced from a similar portion of one of said pole pieces when said clutch is disengaged, said engaging surfaces being so shaped and dimensioned that the conical portions thereof come into engagement before said radially disposed portions, whereby the magnetic forces between the latter portions may cause said engaging surfaces to wedge more tightly together to increase the torque transmitting capability of said clutch.

11. The combination defined in claim 10 in which said armature fits radially within said pole pieces, said radially disposed portion of said armature surface extending radially outwardly from the conical portion thereof, said armature and said pole pieces being formed of a plurality of laminations of magnetic material, said armature and pole pieces providing the engaging surfaces of said clutch, whereby when said engaging parts are wedged together by magnetic attraction therebetween, at least one of them is adapted to yield resiliently thereby to maintain substantial frictional forces therebetween during portions of alternating flux cycles when the instantaneous flux density is at a minimum.

12. The combination defined in claim 10 including a pulley, means mounting said pulley for rotation about said axis in a fixed axial position, coupling means connecting said pulley to said armature, said coupling means being adapted to maintain a substantially fixed relative rotational position of said pulley and armature and to yield resiliently in an axial direction along said axis to permit said driving member to engage said driven member.

13. An electro-magnetic clutch comprising, in combination, an axially fixed first rotatable member adapted to be driven rotatably about a fixed axis, said first rotatable member including a pair of annular magnetic pole pieces forming portions of an interior conical surface, an axially movable second rotatable member frictionally engageable with the pole pieces of said first rotatable member, means mounting said movable second member for rotation about said axis independently of said first member, said mounting means allowing axial movement of said second rotatable member along said axis into and out of frictional engagement with the pole pieces of said first rotatable member, spring means normally holding said first and second members from frictional engagement therebetween, said movable second member including a conical magnetic armature portion adapted upon said axial movement to engage both of said pole pieces, whereby when a magnetic field is developed across said pole pieces the field passes through said magnetic armature portion and draws said movable second member into engagement with said first rotatable member with sufficient force to transmit rotational energy from one of said members to the other, and a fixed magnetizing coil assembly magnetically coupled to said rotatable pole pieces and adapted to induce a magnetic field therein upon energization of said coil, the engaging surfaces of said pole pieces and said movable armature member having generally interfitting tapers, to effect a wedging engagement between said members substantially increasing the torque transmitting frictional forces therebetween upon energization of said coil.

14. The combination of claim 13 in which said rotatable pole pieces and said movable magnetic armature portion are each constructed of a plurality of laminations of resilient magnetic material to provide increased frictional engagement of said pole pieces with said armature and to minimize eddy current losses when said fixed magnetizing coil is energized by alternating current.

15. A magnetic clutch comprising in combination a laminated conical armature of magnetic material rotatable about a fixed axis; a clutch member having a pair of axially spaced laminated pole pieces jointly rotatable about said axis, said pole pieces being spaced by a non-magnetic material, said clutch member being conically dished for frictional engagement with said armature, and electro-magnetic means adapted upon energization to induce magnetic flux in said pole pieces, both pole pieces engageable with said armature, with at least one of said pole pieces slightly deformable by said armature whereby frictional engagement is maintained during periods of low magnetic flux.

16. A magnetic clutch comprising in combination a conically dished member having a pair of axially spaced laminated pole pieces of magnetic material jointly rotatable about a common axis, said pole pieces being spaced by a non-magnetic material; a conically shaped laminated armature of magnetic material rotatable about said axis and movable therealong into frictional engagement with said dished member; and electro-magnetic means adapted upon energization to induce magnetic flux in said pole pieces whereby the magnetic flux passes through one pole piece, through said armature and then through the other pole piece of said pair to retain the conical surfaces of said dished member and conical armature in close frictional engagement.

References Cited in the file of this patent

UNITED STATES PATENTS 2,481,028    Lear    Sept. 6, 1949
2,840,205    Linke    June 24, 1958